Nov. 5, 1963          E. P. MILAN          3,109,532
                    MAGNETIC CONVEYOR
Filed July 2, 1962                    2 Sheets-Sheet 2
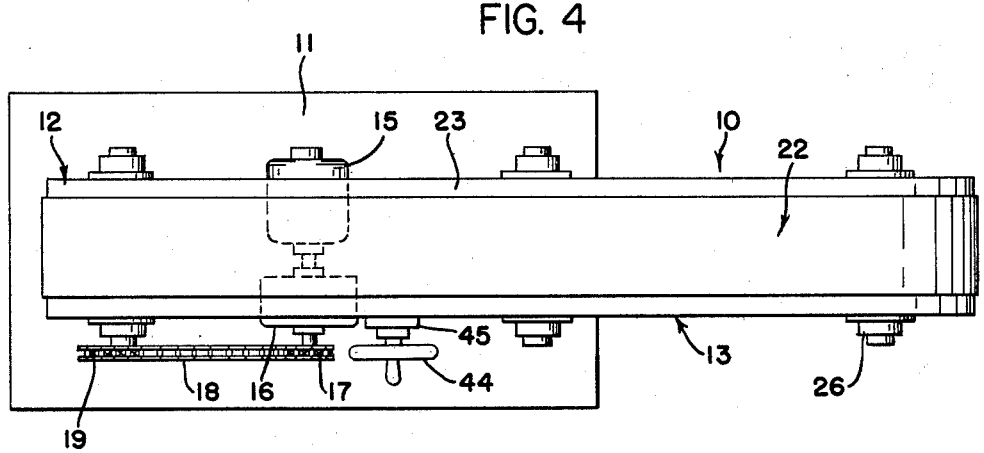
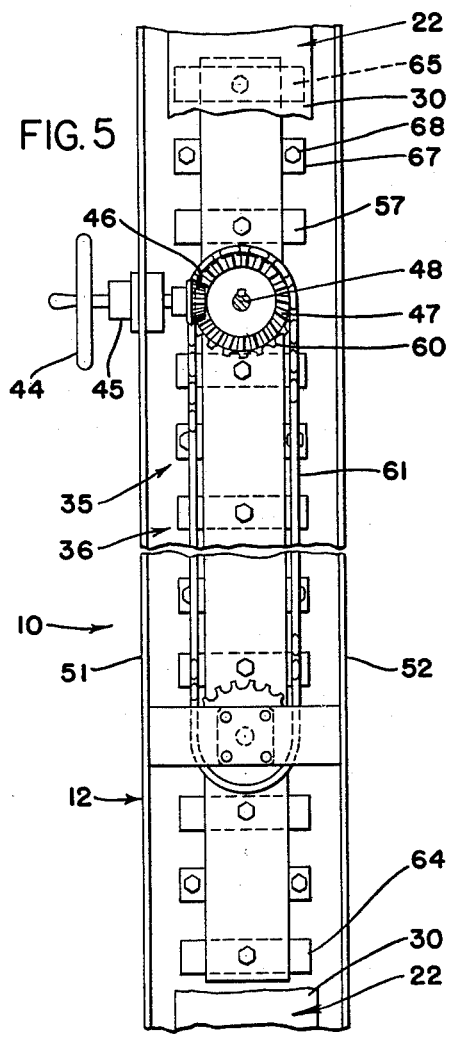
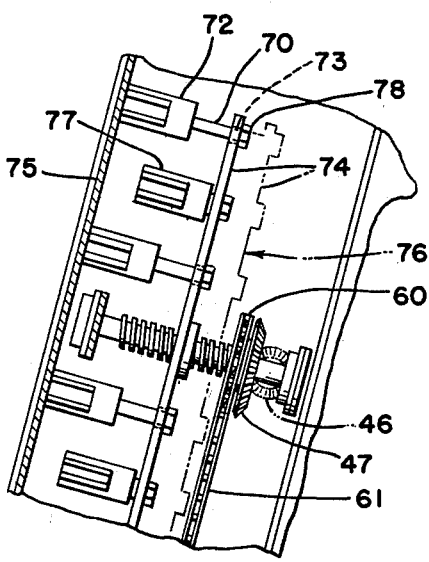
INVENTOR.
EMIL P. MILAN
BY
*Fay & Fay*
ATTORNEYS United States Patent Office 3,109,532
Patented Nov. 5, 1963

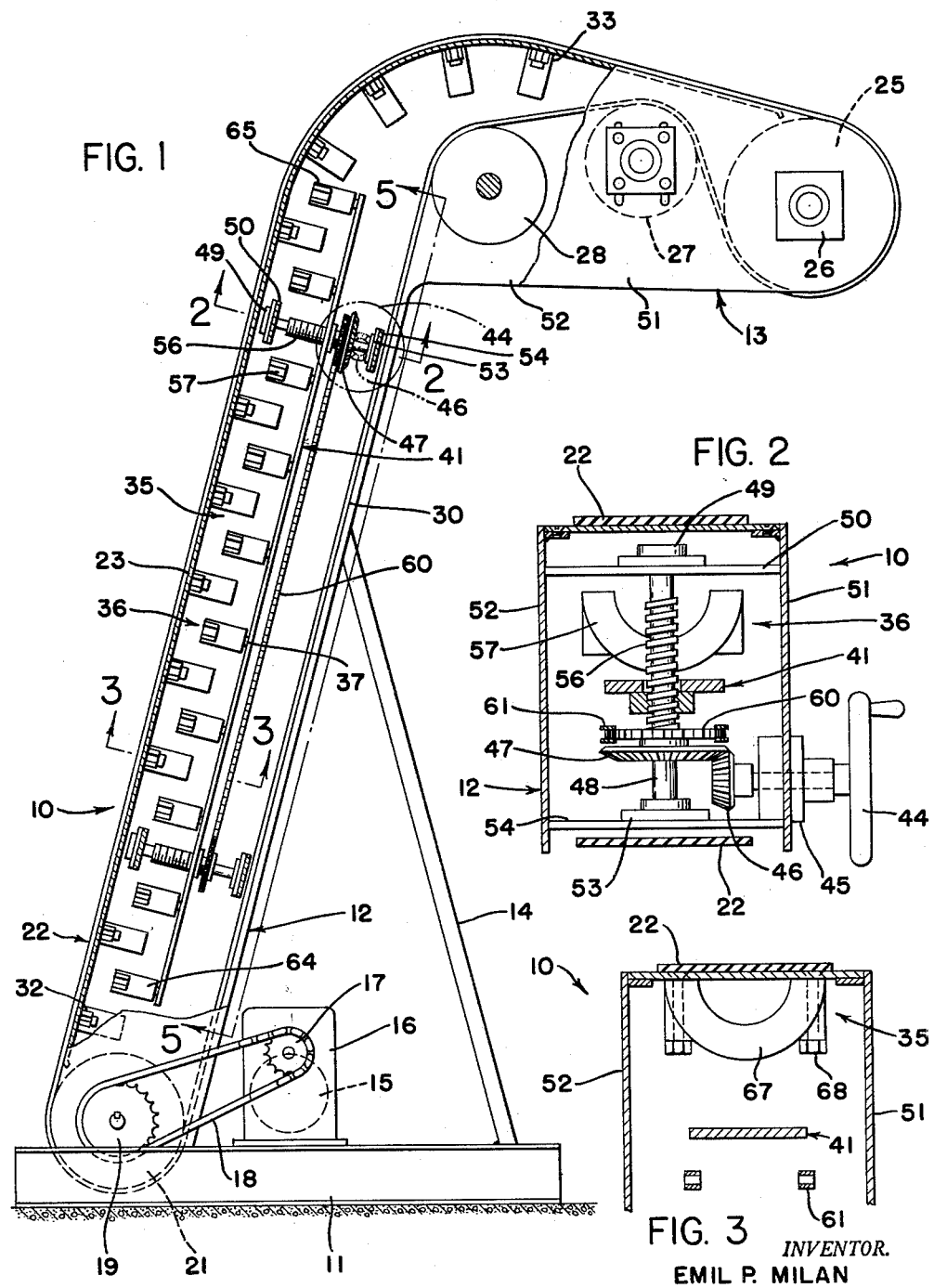

3,109,532
MAGNETIC CONVEYOR
Emil P. Milan, Cleveland, Ohio, assignor to Magnatron Corporation, Cleveland, Ohio, a corporation of Ohio
Filed July 2, 1962, Ser. No. 206,822
5 Claims. (Cl. 198—41)

This invention relates, as indicated, to a magnetic conveyor and is particularly directed to a permanent magnet conveyor specifically adapted for moving on a conveyor belt in a substantially vertical direction individual particles such as machined pieces and the like. The magnetic conveyor is further characterized by the capacity to vary the flux density on the belt so as to hold a variety of magnetically susceptible articles depending upon their individual size and weight.

This invention more specifically relates to an angled or inclined magnetic conveyor to be used in moving individual machined pieces or assembly parts varying in weight from about a few ounces to approximately one hundred pounds. The conveyor is still further characterized by having a flexible belt of rubber, elastomer and the like, installed over a non-magnetic surface which has placed thereunder a plurality of variable permanent magnets critically spaced and adjustable with respect to the rubber belt, so as to obtain the magnetic flux needed to hold the articles while they are being conveyed up an incline to a subsequent machining or assembling operation.

This invention is also directed to a particular design of a magnetic conveyor and to a means of varying the magnetic flux by simply adjusting a mechanical device which, in turn, varies the magnetic pull needed to hold machined pieces or the like depending on their various sizes and weights.

In general, magnetic conveyors are well known, especially in the field of magnetic separation, where they are used for separating particles such as iron ore and the like. This type of magnetic conveyor is illustrated in United States Letters Patents, Nos. 2,591,122; 2,470,889; 1,218,916; 2,785,801 and 2,767,823.

The present invention, however, is more specifically directed to a permanent magnetic conveyor designed for moving metal parts in a manufacturing or assembly operation. The conveyor is adapted so that many different parts having different weights can be moved at a relatively sharp angle, e.g. 75 to 85 degrees, on a belt from one machining or assembling operation to another without any difficulty.

This is accomplished by varying at will the flux density on the belt to such a degree that a very heavy or very light particle can be moved up the belt due to the pull of the permanent magnets placed opposite the surface of the moving belt. Here a plurality of permanent magnets are adjusted on a movable bar so as to give the desired amount of magnetic pull on the belt.

The present practice of varying the magnetic fields on a conveyor belt or table is to physically add or remove one or more magnets from the conveyor, whichever is necessary, to hold the particular object being conveyed. This practice, however, is time-consuming, expensive and impractical for most commercial purposes. The varying of the magnetic field on an electric magnetic conveyor is accomplished only by an A.C.-D.C. converter with a rheostat to control the current. Here again the use of such equipment is expensive and heavy, particularly on small jobs, where it is essential that the conveyor be light and portable so that it can be moved from place to place.

Consequently, if it is desirable to change the magnetic field so as to allow a greater versatility in the handling of different parts, it would ordinarily require the removal or addition of one or more permanent magnets to the conveyor. By the present invention, however, the magnetic flux on the conveyor belt can be regulated by simply adjusting a plurality of adjustable permanent magnets in spaced relationship to a plurality of stationary magnets. This adjustment can be accomplished immediately and easily to meet the requirements of a particular job.

Accordingly, it is an object of this invention to provide a new and improved, permanent magnet conveyor for purposes of moving magnetically susceptible parts up an incline by simply adjusting the magnetic flux on the conveyor belt.

It is another object of this invention to provide a portable, permanent magnet conveyor for purposes of moving magnetically susceptible parts up an incline by readily adjusting the magnetic flux on the conveyor belt in accordance with the weight of the part being moved from one location to another.

It is another object of this invention to provide an inclined magnetic conveyor which can be easily placed into working position and adjusted to carry various machine parts or the like of various weights by mechanically positioning a plurality of permanent magnets in proper relation to the conveyor belt.

It is still another object of this invention to provide a novel magnetic conveyor containing a plurality of stationary permanent magnets and a plurality of movable permanent magnets, said movable magnets being mechanically adjustable in parallel alignment to the stationary magnets and the conveyor so as to vary the magnetic flux on the conveyor belt at will.

A still further object of this invention is to provide a method of varying the flux density of a conveyor by adjusting a plurality of permanent magnets in parallel alignment to the magnetic conveyor to obtain the magnetic flux desired.

To the accomplishment of the foregoing and related ends, this invention consists of the means hereinafter fully described and particularly pointed out in the claims, the following description setting forth in detail one approved means for carrying out the invention, such disclosed means, however, constituting only one of the various ways in which the principles of this invention may be used.

In the drawings,

FIG. 1 is a side elevational view of the new and improved conveyor showing, with some parts broken away, some of the details therein;

FIG. 2 is a cross-sectional view through the conveyor along the line 2—2 of FIG. 1 showing the arrangement of magnets in respect to the conveyor;

FIG. 3 is a further cross-sectional view of the conveyor along the line 3—3 of FIG. 1 showing one of the permanent magnets in fixed position on the conveyor;

FIG. 4 is a top plan view of the new and improved conveyor;

FIG. 5 is a rear view of the new and improved conveyor showing the adjustment hand wheel and the chain drive for the variable magnet support;

FIG. 6 is an enlarged view of the magnets and the adjustment therefor showing the details of a modified form of the invention in which permanent magnets are attached to the variable magnet support providing for further adjustment of both groups of magnets relative to one another and in sequence.

In the drawings, 10 shows a magnetic conveyor generally having in its component parts a base member 11, an upright support 12, a head portion generally shown at 13 and an inclined or slanted support 14 for the upright support 12. The basic components of the conveyor are, of course, a motor 15, a variable speed drive, a gear reducing means 16, a chain sprocket 17, and a chain 18 driving a second sprocket 19 which, in turn, has a drum 21 and a rubber belt 22 thereon, said belt passing over the drum 21 and over the upwardly sloping or inclined surface 23 which would be of non-magnetic material such as stainless steel or the like.

The other components forming the loop for the rubber belt would be a further top drum 25 showing a bearing therefor at 26, a tension drum 27 and an idler drum 28, the belt passing around the drum 25 and over the tension drum 27 and idler drum 28. The rubber belt is indicated again on the return trip at 30 passing behind the permanent magnet support device.

The particular features of this invention that are important are the means for varying the magnets. The magnets themselves are shown in a series starting from the lower portion of the magnetic conveyor. One of these magnets is shown at 32 at the bottom portion of the conveyor and the top magnet on the upper portion of the magnetic conveyor is seen at 33. These magnets are generally indicated as the permanent magnets of the conveyor at 35.

A second group of magnets are indicated generally at 36, each of said magnets being attached as at 37 to an adjustable magnet support 41. Support 41 is actuated in a direction perpendicular to the surface of the magnetic conveyor 23 while remaining, at all times, parallel thereto and reducing the clearance between the surface of the magnetic conveyor and the support. This is done by the following mechanism. A hand wheel seen at 44 is mounted in a pillow block 45 and drives a pair of bevel gears, one of which is seen at 46 and the other at 47. One of these gears is mounted on a shaft 48 which is mounted in a set of bearings, one showing at 49, and supported as by means of a cross-member 50 to the sides of the conveyor at 51 and 52 respectively. The opposite bearing 53 is supported to the back member 54. The back support member 54, in turn, is attached to the sides 51 and 52. Bevel gear 47 drives the shaft and has a worm gear 56 thereon. This moves the adjustable magnetic support 41 by means of the block 40 causing a permanent magnet 57 attached as by means of the connection 58 to the support 41 to move in closer proximity to the surface 23 of the magnetic conveyor. Each of these magnets is spaced at a carefully calculated interval, perhaps on six inch centers, along the magnetic surface. At the same time that hand wheel 44 moves bevel gears 46 and 47, it rotates a sprocket shown at 60 which has a chain 61 thereon and a second sprocket mounted in the lower reaches of the magnetic conveyor on a similarly designed shaft which moves the lower end of the same adjustable support so that both ends of this support are in exact parallel alignment with the surface of the magnetic conveyor at all times. This will permit the lowest adjustable magnet, which is shown at 64, to move in parallel alignment to the upper adjustable magnet 65 so that they will come as close to the surface as they are permitted at exactly the same time and will have exactly the same spacing to the magnetic conveyor.

FIGS. 2 and 3 show this relationship, FIG. 3 particularly showing one of the permanent magnets in position, the surface of the conveyor being indicated at 23 and the rubber belt thereon moving along the surface at 22. A permanent magnet spanning the entire width of the conveyor is seen at 67 having bolt securing means shown at 68 to hold it to the surface of the magnetic conveyor 23. The adjustable magnets shown in FIG. 2 would, of course, be attached to the adjustable magnet support. In this same view, FIG. 3, the magnet support 41 is shown as well as the chain 61.

A modification of this invention is shown in connection with FIG. 6, where it will be seen that the permanent magnets, earlier designated generally at 35 and fixedly attached as shown in connection with FIG. 3, are attached in this modification by means of a central lug 70. The permanent magnet now being adjustable is shown at 72. This is attached, as it will be seen, by means of a loose connection generally designated at 73 in the adjustable magnetic support, now designated 74. The drive means generally described before including the bevel gears 46 and 47 as well as the sprocket 60 and the chain 61 are identical; the only difference being herein that the adjustable magnets may be moved forward to increase the flux density on the surface of the magnetic conveyor, said surface being indicated generally at 75. By moving the magnets towards the surface, it will increase the flux density and support larger articles on the magnetic conveyor. On the other hand, when it is desirable to reduce the flux density, the magnets may be moved away from the surface of the magnetic conveyor to the position generally indicated at 76. In this modification, not only will the adjustable magnets, one of which is shown at 77, be moved to the right, but also the first magnets which originally were permanent magnets. These also would be attached and moved by means of the nut 78 attached to the end of the bar 70, which picks up the nut 78 moving all the permanent magnets to the right and away from the magnetic surface. This will further reduce the flux density on the magnetic conveyor and will be particularly suitable for very light articles upon which a low flux density will be adequate to support them on the surface of the magnetic conveyor. It will be noted, of course, that as the first series of magnets, one of which is shown at 77, is moved away from the surface of the magnetic conveyor, the second series of magnets, one of which is shown at 72, will not be moved, but rather the adjustable magnetic support will move in a loose fit which is shown at 73 along the rod 70 and not affect the magnet at all. These same magnets would be fastened in riding rails such as are shown in FIG. 3 without, of course, the heads 68 being shown thereon.

For further details of this invention, it will be illustrated in a specific example which might be required in the machine operation or in connection with a manufacturing operation of a part weighing either an ounce or two or as much as 90 pounds. Generally, such a part would come off some machine operation and might be at a very low level in a bin and would have to be moved to the next operation and a subsequent hopper. This would require a movement of upward from four, five or six feet and generally there would be inadequate floor space between the machines to permit a gradually sloped conveyor. To perform this operation a magnetic conveyor would be sometimes desirable, but these magnetic conveyors would have to be varied to suit the parts being moved in such operations. The parts might be heavy or light and if a fixed magnetic flux density were used for each operation, the part, if it were too light, would be held to the belt and the magnet would be stronger than the frictional force of the part and the rubber belt, causing the part to turn over and over on the belt. On the other hand, if the part were too heavy for the flux density, it would fall off the belt.

A typical example of the spacing of these magnets would be at six inch intervals and they might have a diameter of two inches. As will be seen in the first modification, a series of permanent magnets are interspersed with adjustable magnets on an adjustable magnet support. In the second version, both sets of magnets are carried by the adjustable magnet support.

The advantages of this combination are that machine parts, generally of iron or having some amount of iron in them, can be moved from one station to another in a manufacturing operation in a substantially vertical direction as is frequently required. These parts can be of different weights and a simple operation of a hand wheel can set the adjustable magnets so that the flux density is adjusted to the requirements of the specific part so that it will move up the rubber belt without slipping thereon and without holding to the magnet and rolling over on the belt. This is an important consideration because it reduces damage to the parts and permits a wide flexibility in a single conveyor for all the necessary machine operations.

This invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a magnetic conveyor adaptable for carrying distinct magnetizable articles of varying weight and size in a vertical direction, a sloped conveyor surface, flexible belt conveying means on said surface, drive means for said belt, a multiplicity of fixed magnets at regular intervals behind said conveying surface, adjustable magnet means parallel to said conveyor surface comprising an adjustable magnet support mounted in substantially parallel position to the conveyor surface, a multiplicity of magnets secured to said adjustable magnet support and being spaced at regular intervals on said support, means for moving said adjustable magnet support and magnets in substantially parallel alignment to said conveyor surface to increase the flux density on said conveyor surface.

2. In a magnetic conveyor of claim 1, said means for moving the adjustable support comprising screw adjustment means on at least two portions of said adjustable magnet support, drive means for said screw adjustment means to move the adjustable magnet support in parallel alignment to said conveyor surface.

3. The magnetic conveyor of claim 2 above in which said drive means for said adjustable magnet support comprises a pair of sprockets, one on each of said screw means and a drive connection therebetween whereby drive means on one of said sprockets will move said sprockets and said screw adjustment means together with the adjustable magnet support in parallel alignment to said conveyor surface.

4. In a magnetic conveyor for individual magnetizable metallic particle movement in a substantially vertical direction, a generally vertical conveyor surface, a flexible belt thereon, drive means for said belt to continuously pass over said surface to move said particles in an upward direction, magnetic conveyor means behind said surface comprising a multiplicity of magnets at fixed intervals along said surface and covering substantially the full length of the conveyor, adjustable magnet support means behind said conveyor, said magnet support being parallel to said conveyor surface, means for moving said adjustable magnet support parallel to said conveyor surface, said support having a multiplicity of magnets at regular intervals along said support and interspersed therebetween said first set of magnets behind the conveyor surface, whereby the flux density on the belt may be varied to suit the size of the individual magnetizable particle moving therealong and to hold the same securely to the flexible belt.

5. The magnetic conveyor belt of claim 4 in which said fixed magnets behind said conveyor surface are secured by means of rods in a loose connection to the adjustable magnet support and in which said rods have a head on the opposite side of said rod from said magnet whereby said fixed magnets may be moved to decrease the flux density further by moving the adjustable magnet support further from the conveying surface causing the adjustable magnet support to engage the head of the fixed magnets and move said fixed magnets farther from the conveying surface to further reduce the flux density on the conveyor surface.

No references cited.